United States Patent
Nagano et al.

(10) Patent No.: US 11,159,513 B1
(45) Date of Patent: Oct. 26, 2021

(54) SYSTEMS, APPARATUS, AND COMPUTER PROGRAM PRODUCTS FOR INSTALLING SECURITY CERTIFICATES IN PUBLICLY ACCESSIBLE PRINTER STATIONS THROUGH GATEWAY

(71) Applicant: KYOCERA Document Solutions Inc., Osaka (JP)

(72) Inventors: Daisaku Nagano, Pleasant Hill, CA (US); Hooman Majidzadeh Rezvani, Pleasant Hill, CA (US)

(73) Assignee: KYOCERA Document Solutions Inc.

( * ) Notice: Subject to any disclaimer, the term of this patent is extended or adjusted under 35 U.S.C. 154(b) by 0 days.

(21) Appl. No.: 16/887,514

(22) Filed: May 29, 2020

(51) Int. Cl.
| | |
|---|---|
| G06F 21/33 | (2013.01) |
| H04L 29/06 | (2006.01) |
| G06F 3/12 | (2006.01) |
| G06F 21/60 | (2013.01) |
| H04L 9/32 | (2006.01) |
| H04W 12/069 | (2021.01) |

(52) U.S. Cl.
CPC ........ *H04L 63/0823* (2013.01); *G06F 3/1222* (2013.01); *G06F 3/1238* (2013.01); *G06F 21/608* (2013.01); *H04L 9/3236* (2013.01); *H04W 12/069* (2021.01)

(58) Field of Classification Search
None
See application file for complete search history.

(56) References Cited

U.S. PATENT DOCUMENTS

| | | | |
|---|---|---|---|
| 9,154,307 B2 | 3/2015 | Hattori | |
| 9,930,028 B2 | 3/2018 | Van Den Broeck et al. | |
| 10,057,243 B1* | 8/2018 | Kumar | H04L 9/321 |
| 2008/0137859 A1* | 6/2008 | Jagadeesan | H04L 63/062 |
| | | | 380/270 |
| 2011/0317199 A1 | 12/2011 | Makishima et al. | |
| 2015/0106946 A1* | 4/2015 | Soman | G06F 21/602 |
| | | | 726/26 |
| 2018/0241574 A1 | 8/2018 | Kakutani et al. | |
| 2018/0335990 A1* | 11/2018 | Nishikawa | G06F 21/608 |
| 2018/0359101 A1 | 12/2018 | Yamauchi | |
| 2018/0359102 A1* | 12/2018 | Kakutani | H04L 9/0825 |
| 2019/0386835 A1* | 12/2019 | Tsuchitoi | H04L 9/085 |

* cited by examiner

*Primary Examiner* — Haris Sabah
(74) *Attorney, Agent, or Firm* — Law Office of Alexis J Saenz (57) ABSTRACT

Embodiments facilitate the management of security certificates for printers that are used in public locales. The system communicates with and manages the printers with the benefits of security certificate protocols on-demand as a user requests to print documents with any particular printer. Once a document is requested to be printed at a printer, the system registers the printer with the network. At registration, a gateway is automatically installed. the gateway requests a security certificate which is stored on the printer or its associated computer. Aspects thus solve an online service's need to install and manage certificates for any printer accessible to the network.

20 Claims, 4 Drawing Sheets

SYSTEMS, APPARATUS, AND COMPUTER PROGRAM PRODUCTS FOR INSTALLING SECURITY CERTIFICATES IN PUBLICLY ACCESSIBLE PRINTER STATIONS THROUGH GATEWAY

CROSS-REFERENCE TO RELATED APPLICATION

None.

FIELD

The subject disclosure relates to network-based device management and more particularly to systems, processes, and computer program products for automated management of certificates in publicly accessible printer stations.

BACKGROUND

Many networked based services are now available to the general public. For example, printing services conventionally required one to use a store front that offered the services. With the addition of home printers, one is now able to print at home.

Today's printing behavior, however, also requires individuals to print on-the-go outside the office or home space. Sometimes a person needs to print an updated document on the way to a meeting. Other times, a person needs to print a ticket for admission into a venue. Cloud-based printing is now a prevalent solution that is expected by the general public, to provide printing services outside the office or home space.

A person may now even print a document from for example, a mobile computing device such as a smart phone or tablet, using a publicly available printer and an application service manages the print job and fees. For example, Kyocera has a product called Anytime Print (ATP) which offers cloud-based printing at publicly available printer stations.

However, since the printer is in a public location, there are challenges in maintaining security at the printer when working with cloud-based documents. The printer is outside the control of network administrators because the printer is not used exclusively within a singular network when accessed by an external printing service. Thus, a request for a printing service to print at a publicly available printer faces the challenge of performing the transaction securely.

As can be seen, there is a need to improve on the management of security of publicly available printers connected to a network.

SUMMARY

In one aspect of the disclosure, a method of managing security for a plurality of remote network connected printer devices is disclosed. The method comprises: accessing a security management controller of a remote public printer station, wherein the remote public printer station is connected to a cloud-based network and to a network manager controlling the cloud-based network; registering the remote public printer station with the cloud-based network; in response to the remote public printer station being registered with the cloud-based network, automatically installing a gateway between the remote public printer station and a simple certificate enrollment protocol (SCEP) server; obtaining, by the network manager, a first security certificate from the SCEP server; and installing the first security certificate in the remote public printer station through the gateway.

In another aspect, a computer program product for managing security for a plurality of remote network connected printer devices is disclosed. The computer program product comprises a non-transitory computer readable storage medium having computer readable program code embodied therewith. The computer readable program code is configured, when executed by a computer processor, to: access, by the processor, a security management controller of a remote public printer station, wherein the remote public printer station is connected to a cloud-based network and to a network manager controlling the cloud-based network; register, by the processor, the remote public printer station with the cloud-based network; in response to the remote public printer station being registered with the cloud-based network, automatically install, by the processor, a gateway between the remote public printer station and a simple certificate enrollment protocol (SCEP) server; obtain, by the network manager, a first security certificate from the SCEP server; and install the first security certificate in the remote public printer station through the gateway, said device certificate on to the one of the plurality of network connected devices.

In yet another aspect, a printer station is disclosed. The printer station comprises: a printer in communication with a computer, wherein the computer includes a software module for managing security for a plurality of remote network connected printer devices through a cloud-based printing service platform. The software module is configured, when executed by a processor of the computer, to: access, by the processor, a security management controller of a remote public printer station, wherein the remote public printer station is connected to a cloud-based network and to a network manager controlling the cloud-based network; register, by the processor, the remote public printer station with the cloud-based network; in response to the remote public printer station being registered with the cloud-based network, automatically install, by the processor, a gateway between the remote public printer station and a simple certificate enrollment protocol (SCEP) server; obtain, by the network manager, a first security certificate from the SCEP server; and install the first security certificate in the remote public printer station through the gateway.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. Like or similar components are labeled with identical element numbers for ease of understanding.

As will be appreciated, embodiments disclosed below may be practiced in and have industrial applicability to the general fields of network security and administration.

Generally, embodiments of the disclosure below facilitate the management of security certificates for printers that are used in public locales. Conventionally, for a printer to have a valid security certificate, the printer was usually part of an administered and defined private network. However, as will be appreciated, the firmware in many end devices such as multifunction printers (MFPs) or standalone printers in a public locale are not part of a formally managed network. By a printer in a "public locale", it is meant that the printer may be accessed by a third-party service for printing a document where the service is accessed through the Internet or a telephony connection. Printers in a print shop, printers in a general store, printers in a hotel, or printers on-site at a venue (for example, a theater, a stadium, an amusement park, etc. where there is a need for a ticket for admission) are examples of printers that are publicly available.

Yet the need exists to provide a secure connection with an end device printer when a user needs to print a document on-demand in a public setting from a remote service. This is because the remote service is not part of the printer's default network and from a security perspective, is an unknown/untrusted source. The lack of a secure connection makes the document open to interception and some computers connected to the printer may not allow the print job to be executed if the message accompanying the print job is not secure. Any sensitive information provided with the print request may thus also be vulnerable to interception if the data is sent to a printer that may not have a valid security certificate available for the transaction. Conventionally, an individual would need to visit the printer site to manually install a security certificate directly into the printer or computer connected to the printer. However, this is impractical for every service that wants to access a printer and for every printer that can be used for the service.

In an exemplary embodiment of the subject technology, a gateway configured to communicate with a security certificate source is automatically installed once a need for a security certificate is made. Through the gateway, a security certificate is retrieved and installed for the printer performing a print job (or its managing computer). The system communicates with and manages the printers with the benefits of security certificate protocols on-demand. This makes any particular printer available to users who have print jobs that require security protocols. This combination of features will solve a service's need to install and manage certificates for any printer accessible to the network.

Figure 1:
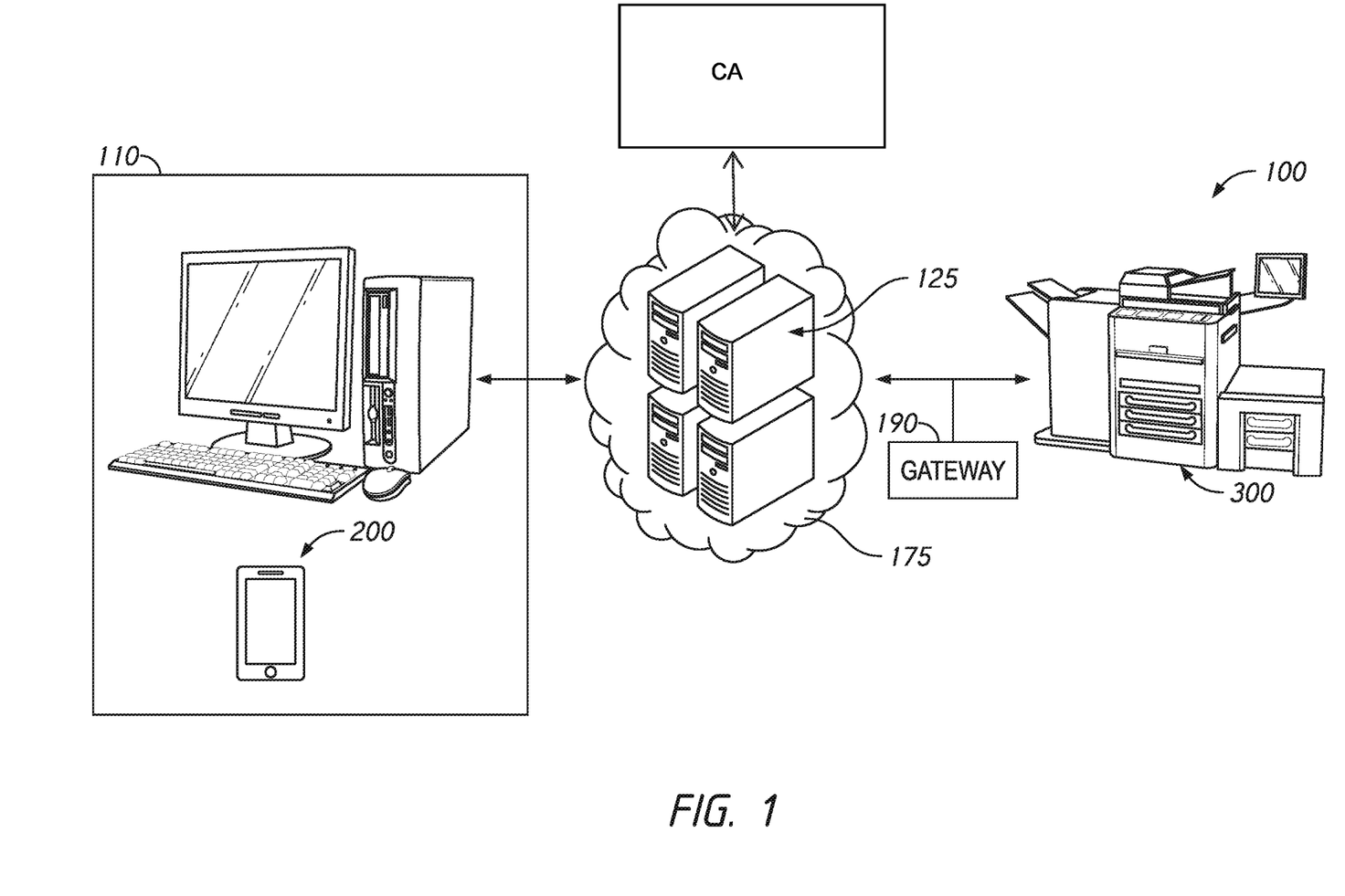
FIG. 1 is a block diagram of a system for printing documents on-demand on publicly available printers in accordance with an embodiment of the subject technology.
Figure 2:
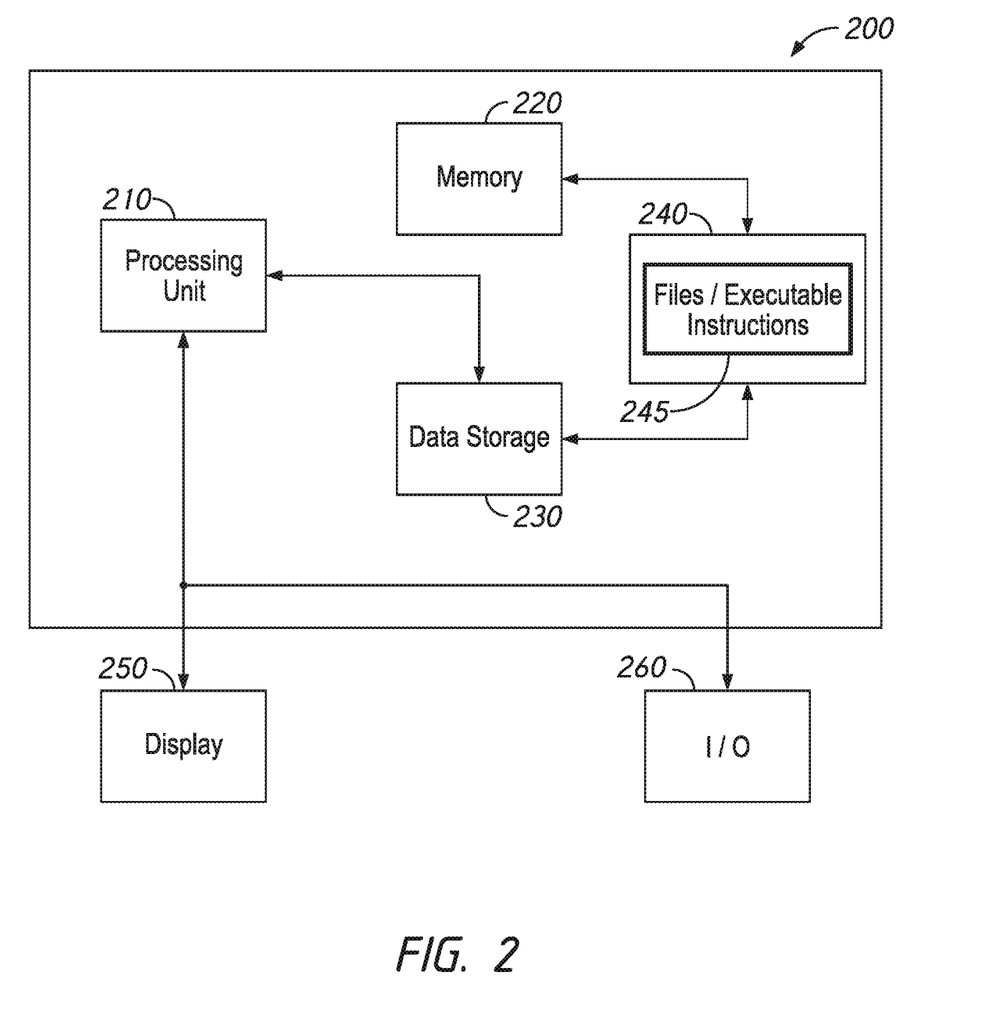
FIG. 2 is a block diagram of a computing device in accordance with an aspect of the subject technology.
Figure 3:
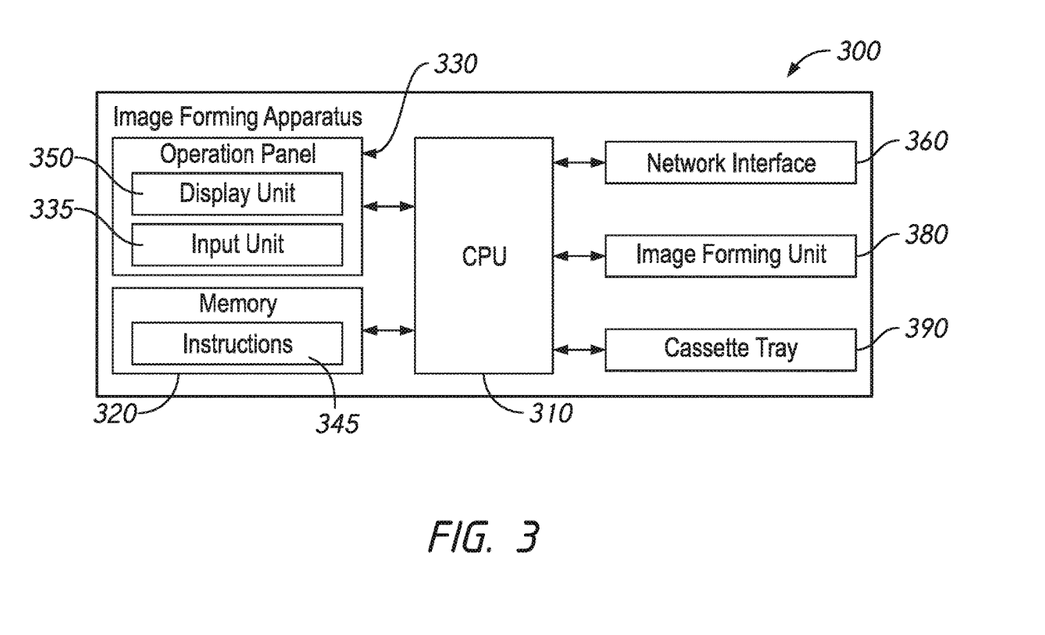
FIG. 3 is a block diagram of a printer device in accordance with an aspect of the subject technology.

Referring now to FIGS. 1-3, a system 100 and machines of the subject technology are shown according to exemplary embodiments. A system 100 is shown in FIG. 1 which may include a computing device 200 in communication with a network-based service 175 (which may be an online platform) configured for printing documents on-demand on publicly available printers. In some embodiments, the network-based service 175 may be connected to a third-party certificate authority ("CA"), from which the network-based service 175 may receive digital certificates, receive keys, and may certify ownership of keys. The network-based service 175 may comprise a plurality of computer servers 125 in for example, a cloud-based network (sometimes referred to generally, as the "network 125"). The computer servers 125 may in some embodiments, fit the description of computing devices 200 as is discussed in more detail with respect to FIG. 2. The network 125 may be connected to a plurality of printers 300. There may be a pre-existing connection between a printer 300 and the network-based service 175 or a connection may be formed on-demand by the user through a general Internet or other telephony connection. In some embodiments, a user may access the system 100 through a printer station which may comprise the computing device 200 connected directly to the printer 300. In some embodiments, the printer station may comprise a stand-alone printer 300 with a network connection. In other embodiments, the user may access the printer 300 through the network service 175 which identifies the printer 300 by detecting network devices within the range of the mobile computing device 200.

In an exemplary embodiment, a software application on the computing device 200 may allow the user to upload the document for printing to the network-based service 175. The network-based service 175 may route the document to the printer 300 once the requirements of the service are met by the user and a gateway 190 is installed that forwards the security certificate for the transaction. For example, registration and payment requirements may need to be fulfilled before sending the print data to the printer 300.

In an exemplary embodiment, the system 100 includes a gateway 190 that is added to the connection between the network 125 and the printer 300. The gateway 190 becomes part of the network for purposes of security management. As will be appreciated, in a conventional arrangement, a printer may be connected to a generic network. The use of the printer on-demand would be vulnerable to security risks because the printer would not have a security certificate available recognized by the service. As will be appreciated, aspects of the subject technology make any printer with an available network connection readily enabled for installation of a valid security certificate. In an exemplary embodiment, once the printer 300 is requested through the service 175 for printing of a document, the printer 300 may be registered with the network 125. In addition, the gateway 190 may be automatically installed as an intermediary point between the printer 300 and a security certificate source (for example, a SCEP server and/or a certificate authority). A network device manager which may be software located in the network 125 may control when the gateway 190 is installed and when security certificates should be generated, retrieved, or renewed.

FIG. 2 shows a schematic example of a computing device 200. FIG. 3 shows a schematic example of the printer 300. In some embodiments, the computing device 200 may be an on-site computer (for example, a PC or all-in-one) connected to the printer 300 with the network service 175 available through an app or through a website. In such a scenario, the user may upload the document on to the computing device 200 from an external storage device. In some embodiments, the computing device 200 may be for example, a smart phone or tablet computer with an app that allows the user to order the printing of documents from the smart phone or tablet through a wireless telephony connection. In some embodiments, a process(es) described below may be loaded as executable instructions into one or both of the computing device 200 and the printer 300. In general, process(es) or steps in the process(es) may be implemented by either or both the computing device 200 and the printer 300.

Referring now to FIG. 2, a schematic of an example of a computing device 200 is shown in detail. As will be appreciated, some aspects of the embodiments disclosed above may turn the computing device 200 into a special purpose computer system that specifically manages, monitors, and renews security certificates for printers connected to the service 175. For example, in the role of a host server, the computing device 200 may implement for example the functions of registering a printer, checking for a valid certificate on the printer, storing security certificates, scheduling querying of printer certificate status, and determining validity of certificate statuses.

In the role of a user device, the computing device 200 is generally not a server but may instead be desktop computers, tablet or laptop computers, all-in-one computer stations, a mobile computing device (for example, a smart phone, smart wearable devices (glasses, jewelry, watches, ear wear, etc.)), or programmable electronics.

The components of the computing device 200, may include, but are not limited to, one or more processors or processing units 210, a system memory 220, data storage 230, a computer program product 240 having a set of program modules 245 including files and executable instructions, and a bus system that couples various system components including the system memory 220 to the processor(s) 210.

The computing device 200 may be described in the general context of computer system executable instructions, such as program modules 245 which represent a software embodiment of the system and processes described generally below. The program modules 245 generally carry out the functions and/or methodologies of embodiments as described above and below. As such, while not described in detail, the software modules (for example, the service 175) generally referred to above may be understood to be one example of program modules 245.

The computing device 200 may typically include a variety of computer system readable media. Such media could be chosen from any available media that is accessible by the computing device 200, including non-transitory, volatile and non-volatile media, removable and non-removable media for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing. The system memory 220 could include one or more computer system readable media in the form of volatile memory, such as a random-access memory (RAM) and/or a cache memory. By way of example only, the data storage system 230 may read from and write to a non-removable, non-volatile magnetic media device. The system memory 220 may include at least one program product 240 having a set of program modules 245 that are configured to carry out the functions of embodiments of the invention in the form of computer executable instructions.

The program product/utility 240, having a set of program modules 245, may be stored in the system memory 220 by way of example, and not limitation, as an operating system, one or more application programs, other program modules, and program data.

The computing device 200 may communicate with one or more external devices including for example, an electronic display 250 which may in some embodiments be configured for tactile response as in a touch screen display. User input into the display 250 may be registered at the processor 210 and processed accordingly. Other devices may enable the computing device 200 to communicate with one or more other computing devices, either by hardwire or wirelessly. Such communication can occur via Input/Output (I/O) interfaces/ports 260. In some embodiments, the I/O interfaces/ports 260 may be specially configured to handle aspects of the embodiments described herein converting the computing device 200 into a special purpose machine. As such the device 200 may become dedicated to the role of managing network security in a printing device.

The computing device 200, through the I/O interface/ports 260, may communicate with one or more networks such as a local area network (LAN), a general wide area network (WAN), and/or a public network (e.g., the Internet) via a network adapter as is commonly known in the art. Each of the operating system, one or more application programs, other program modules, and program data or some combination thereof, may include an implementation of a networking environment. In some embodiments, the computing device 200 may be a cloud computing node connected to a cloud computing network (not shown). The computer computing device 200 may be practiced in distributed cloud computing environments where tasks are performed by remote processing devices that are linked through a communications network. In a distributed cloud computing environment, program modules may be located in both local and remote computer system storage media including memory storage devices.

As will be appreciated by one skilled in the art, aspects of the disclosed invention may be embodied as a system, method or process, or computer program product. Accordingly, aspects of the disclosed invention may take the form of an entirely hardware embodiment, an entirely software embodiment (including firmware, resident software, microcode, etc.) or an embodiment combining software and hardware aspects that may all generally be referred to herein as a "module", "circuit", or "system." Furthermore, aspects of the disclosed invention may take the form of a computer program product embodied in one or more computer readable media having computer readable program code embodied thereon. In some embodiments, the output of the computer program product provides an electronic user interface on the display 250 which may be controlled via direct contact with the display 250 or via the I/O interfaces 260 (which may be for example, interface devices such as keyboards, touchpads, a mouse, a stylus, or the like).

Aspects of the disclosed invention are described above with reference to block diagrams of methods, apparatus (systems) and computer program products according to embodiments of the invention. It will be understood that each block of the block diagrams, and combinations of blocks in the flowchart illustrations and/or block diagrams, can be implemented by computer program instructions. These computer program instructions may be provided to the processor 210 of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks in the figures.

The printer 300 may be for example, a computing-based image processing and printing device (for example, a printer, a fax machine, a copier machine, a multi-function printer that may include a combination of these plus a scanner). The components of the printer 300, may include, but are not limited to, one or more processors or processing units 310, a system memory 320, an operation panel 330, an input unit 335, a set of program modules 345 including files and executable instructions, a display unit 350, a network interface 360, an image forming unit 380, a cassette tray 390, and a bus system that couples various system components including the system memory 320 to the processor(s) 310. The memory storage 320 may store for example, executable instructions and/or electronic versions of the image objects to be printed. In some embodiments, the system memory 320 includes a security management controller which may be for example, a processing unit 310 with executable instructions programmed into the processing unit. In some embodiments, the security management controller is software stored in the system memory 320. In other embodiments, the security management controller is stored on a computing device 200 connected to the printer 300. In some embodiments, the processors 310 may include a processing unit dedicated to graphics and image processing (for example a graphics processing unit (GPU) or visual processing unit (VPU). As a GPU or VPU, the processor 310 may implement executable instructions focused on image processing applications either alone or in coordination with other general processor 310 types such a CPUs, microchips, and the like. The input unit 335 may be for example, a scanner or I/O port receiving data from a computing device 200. In some embodiments, operation of the image forming unit may be controlled by a user interface accessed by either the operation panel 330 on the apparatus or through a user interface displayed via a program module 345 through a user's computing device.

For the following flowchart, steps of the processes may be referred to as blocks and/or by reference numeral. As will be described further below, steps may be performed by a machine, for example, a computing device and/or a processing unit. In some embodiments, the actions by the machines may be controlled by software including for example, a network device manager or the like. While the steps may be described in one order, it will be understood that variations to the order may be practiced or the order in which claims below are written may vary from the following without departing from the scope of the invention.

Figure 4:
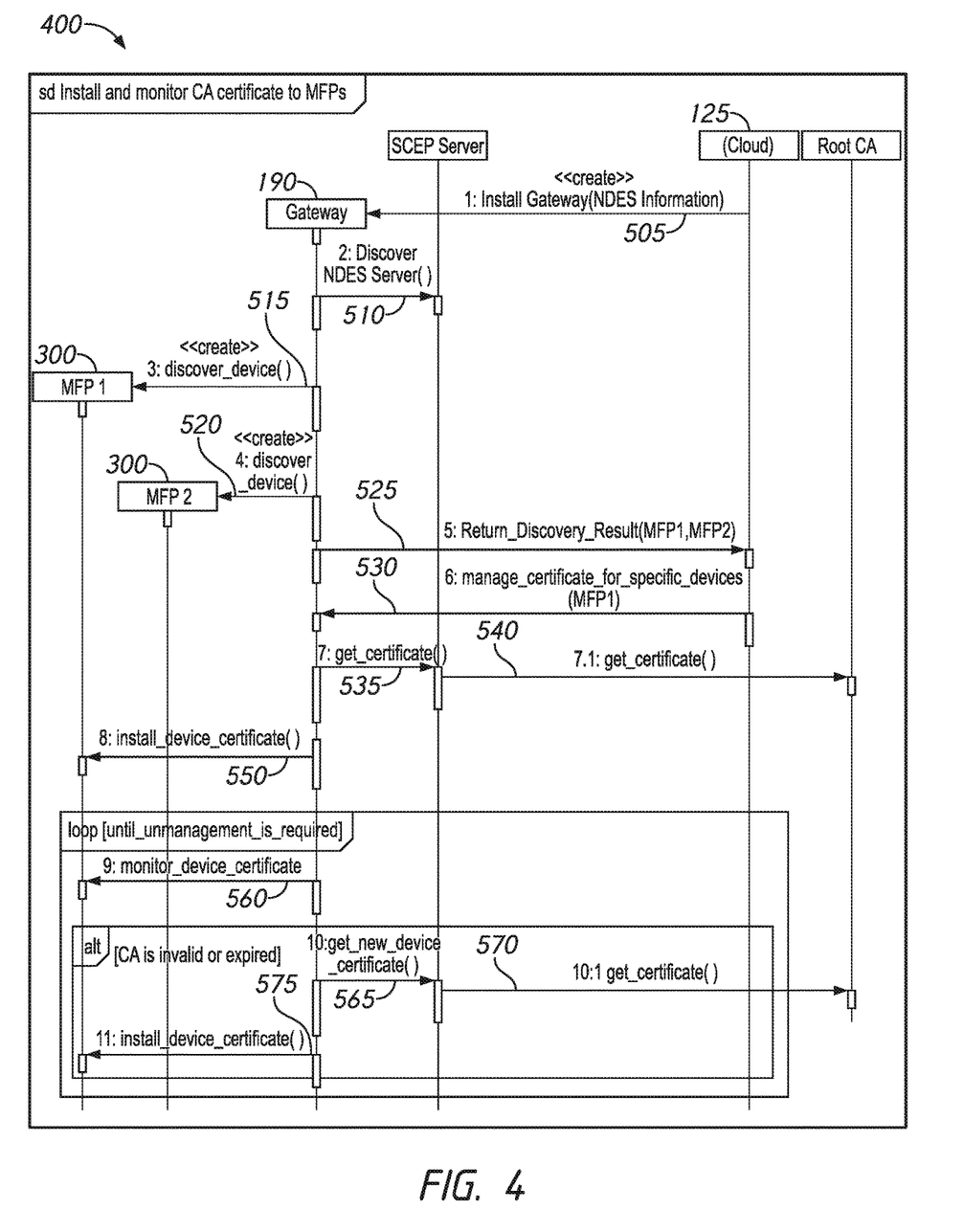
FIG. 4 is a flowchart of a method of managing security for a plurality of remote network connected printer devices in accordance with an embodiment of the subject technology.

Referring now to FIG. 4, a method 500 of managing security for a plurality of remote network connected printer devices is shown according to an exemplary embodiment. The network 125 may create 505 a gateway 190 point that is available for connection with discovered end device printers when a request is made by a service provider to manage the security for a remote printer device. The gateway 190 may discover 510 a security certificate generator (for example, a SCEP server), which may be accessed on-demand when a security certificate is needed for installation with a new end device (printer) joining the service 175, network 125. While the root certificate authority ("Root CA") and the SCEP server are shown as distinct entities, it will be understood that in some embodiments, the Root CA may be present in the SCEP server. Accordingly, in some embodiments, all device certificates may be issued from the SCEP server when the Root CA is in the SCEP server. Or, in some embodiments, device certificates may be issued separately from their respective source, (Root CA or SCEP server) as shown as distinct entities.

In the following, two different scenarios are described with two different printers 300 where a first printer 300 is first discovered and registered into the network 125. The first printer 300 never had a valid security certificate recognizable by the network 125 since it is being used for the first time by the service 175. The second printer 300 was previously registered by the network 125 and is being monitored for a valid certificate. The method 500 will be described first based on the first printer 300 that is new to the network 125.

A printer 300 may be accessed by a user for the first time with the service 175 once the user makes an on-demand request for a print job. In response to the print request through the service 175, the network 125 may discover 515 the location of the printer 300 (for example, by MAC address or IP address) and may register the printer 300 on the network 125. In response to the printer 300 being registered on the network 125, the gateway 190 may be automatically installed (the gateway 190 identifying information) with the printer 300. The gateway 190 becomes an intermediary point between the printer 300 and a security certificate generator (for example, SCEP server) and the network 125. The discovery result may be returned to the network 125. In some embodiments, the printer 300 may have a security management controller that stores security related information including security certificates. The network 125 may check 530 whether the printer 300 has an existing or valid security certificate available for use in the service 175. Since the printer 300 is being registered for the first time with the network 125, the gateway 190 may request 535 a security certificate from the security certificate generating entity. The security certificate generating entity may generate 540 or obtain a security certificate. Once the obtained, the security certificate may be installed 550 in the printer 300 through the gateway 190. The on-demand printing service may be accessed by the user through the printer 300 to print documents as wanted now that the printer 300 has a recognized security certificate.

In some embodiments, a printer 300 may have already been registered with the network 125. The gateway 190 may send 520 a discovery query whose result that recognizes the second printer 300 for example, may be returned 525 to the network 125. The method 500 may monitor 560 the status of the second printer's security certificate by periodically polling the device for a certificate status. In the event that the security certificate was uninstalled (for example, by a technician or a software update) and is missing or the certificate has expired or is invalid, the gateway 190 may request 565 a new security certificate (which request may be forwarded 570 to a certificate authority). The new certificate generated may be installed 575 by the gateway 190 once received.

Those of skill in the art would appreciate that various components and blocks may be arranged differently (e.g., arranged in a different order, or partitioned in a different way) all without departing from the scope of the subject technology. The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

Thus, the claims are not intended to be limited to the aspects shown herein, but are to be accorded the full scope consistent with the language of claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such an embodiment may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method of managing security for a plurality of remote network connected printer devices, comprising:
   accessing a security management controller of a remote public printer station, wherein the remote public printer station is connected to a cloud-based network and to a network manager controlling the cloud-based network;
   registering the remote public printer station with the cloud-based network;
   in response to the remote public printer station being registered with the cloud-based network, automatically installing, by the network manager, a gateway between the remote public printer station and a simple certificate enrollment protocol (SCEP) server;
   obtaining, by the network manager, a first security certificate from the SCEP server; and
   installing the first security certificate in the remote public printer station through the gateway.

2. The method of claim 1, wherein the remote public printer station includes a printer and a computing device connected to the remote public printer station and connected to the cloud-based network, wherein the computing device includes a cloud-based public printing service platform installed onto the computing device.

3. The method of claim 2, wherein the computing device is a mobile computing device connectable to the printer on demand through the cloud-based public printing service platform.

4. The method of claim 1, further comprising receiving a request from the remote public printer station to access a public printing service, wherein the public printing service is administered through the cloud-based network.

5. The method of claim 4, wherein the request to access the public printing service triggers the accessing of the security management controller of the remote public printer station.

6. The method of claim 1, further comprising:
   periodically checking by the network manager whether the first security certificate installed on the remote public printer station is valid; and
   installing a new security certificate through the gateway in the event the first security certificate is determined to be invalid.

7. The method of claim 1, further comprising:
   periodically checking by the network manager whether the first security certificate installed on the remote public printer station is expired or missing; and
   installing a new security certificate through the gateway in the event the first security certificate is determined to be expired or missing.

8. A computer program product for managing security for a plurality of remote network connected printer devices, the computer program product comprising a non-transitory computer readable storage medium having computer readable program code embodied therewith, the computer readable program code being configured, when executed by a computer processor, to:
   access, by the processor, a security management controller of a remote public printer station, wherein the remote public printer station is connected to a cloud-based network and to a network manager controlling the cloud-based network;
   register, by the processor, the remote public printer station with the cloud-based network;
   in response to the remote public printer station being registered with the cloud-based network, automatically install, by the processor and the network manager, a gateway between the remote public printer station and a simple certificate enrollment protocol (SCEP) server;
   obtain, by the network manager, a first security certificate from the SCEP server; and
   install the first security certificate in the remote public printer station through the gateway.

9. The computer program product of claim 8, wherein the remote public printer station includes a printer and a computing device connected to the remote public printer station and connected to the cloud-based network, wherein the computing device includes a cloud-based public printing service platform installed onto the computing device.

10. The computer program product of claim 9, wherein the computing device is a mobile computing device connectable to the printer on demand through the cloud-based public printing service platform.

11. The computer program product of claim 8, further comprising computer readable code configured to:
  receive a request from the remote public printer station to access a public printing service, wherein the public printing service is administered through the cloud-based network.

12. The computer program product of claim 11, wherein the request to access the public printing service triggers the accessing of the security management controller of the remote public printer station.

13. The computer program product of claim 8, further comprising computer readable code configured to:
  periodically check by the network manager whether the first security certificate installed on the remote public printer station is valid; and
  install a new security certificate through the gateway in the event the first security certificate is determined to be invalid.

14. The computer program product of claim 8, further comprising computer readable code configured to:
  periodically check by the network manager whether the first security certificate installed on the remote public printer station is expired or missing; and
  install a new security certificate through the gateway in the event the first security certificate is determined to be expired or missing.

15. A printer station, comprising:
  a printer in communication with a computer, wherein the computer includes a software module for managing security for a plurality of remote network connected printer devices through a cloud-based printing service platform, the software module configured, when executed by a processor of the computer, to:
  access, by the processor, a security management controller of a remote public printer station, wherein the remote public printer station is connected to a cloud-based network and to a network manager controlling the cloud-based network;
  register, by the processor, the remote public printer station with the cloud-based network;
  in response to the remote public printer station being registered with the cloud-based network, automatically install, by the processor and the network manager, a gateway between the remote public printer station and a simple certificate enrollment protocol (SCEP) server;
  obtain, by the network manager, a first security certificate from the SCEP server; and
  install the first security certificate in the remote public printer station through the gateway.

16. The printer station of claim 15, wherein the computer is a mobile computing device connectable to the printer on demand through the cloud-based public printing service platform.

17. The printer station of claim 15, wherein the processor of the computer is configured to receive a request from the remote public printer station to access a public printing service, wherein the public printing service is administered through the cloud-based network.

18. The printer station of claim 17, wherein the request to access the public printing service triggers the accessing of the security management controller of the remote public printer station.

19. The printer station of claim 15, wherein the processor of the computer is further configured to:
  periodically check whether the first security certificate installed on the remote public printer station is valid; and
  install a new security certificate through the gateway in the event the first security certificate is determined to be invalid.

20. The printer station of claim 15, wherein the processor of the computer is further configured to:
  periodically check by the network manager whether the first security certificate installed on the remote public printer station is expired or missing; and
  install a new security certificate through the gateway in the event the first security certificate is determined to be expired or missing.

\* \* \* \* \*